Dec. 26, 1961   MINESABURO SHIMATANI ET AL   3,014,624
APPARATUS FOR DISCHARGING CONCRETE
Filed Feb. 17, 1959   6 Sheets-Sheet 1
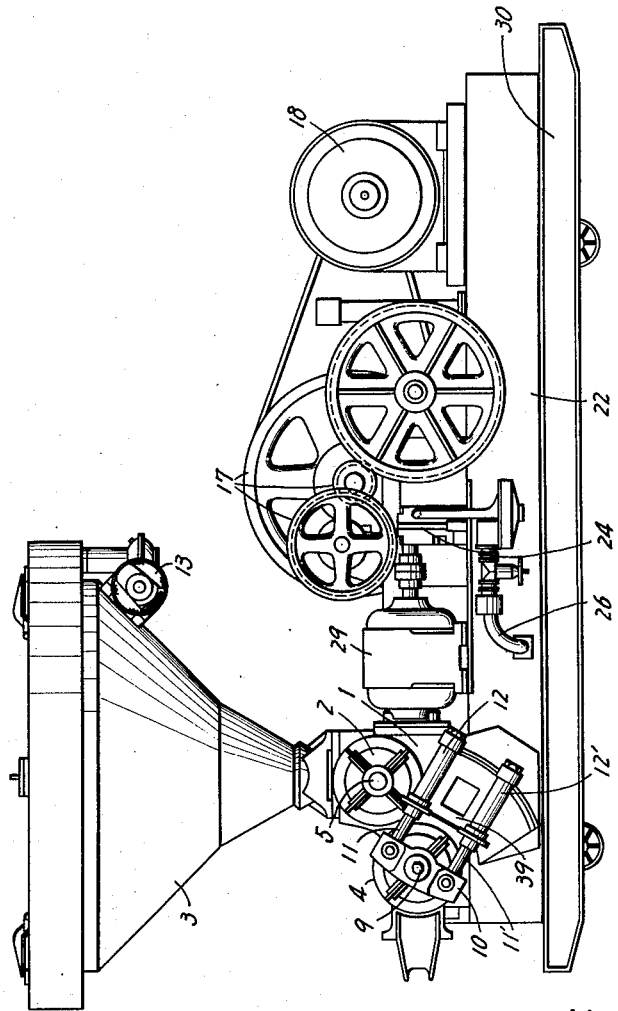
M. SHIMATANI
T. SAITO
INVENTORS

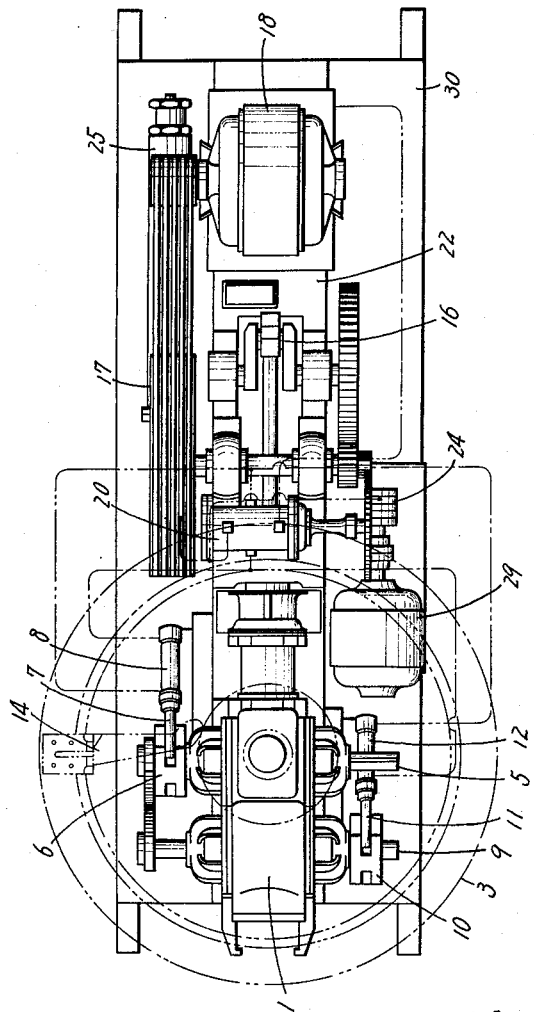

Dec. 26, 1961    MINESABURO SHIMATANI ET AL    3,014,624
APPARATUS FOR DISCHARGING CONCRETE
Filed Feb. 17, 1959    6 Sheets-Sheet 4

M. SHIMATANI
T. SAITO
        INVENTORS

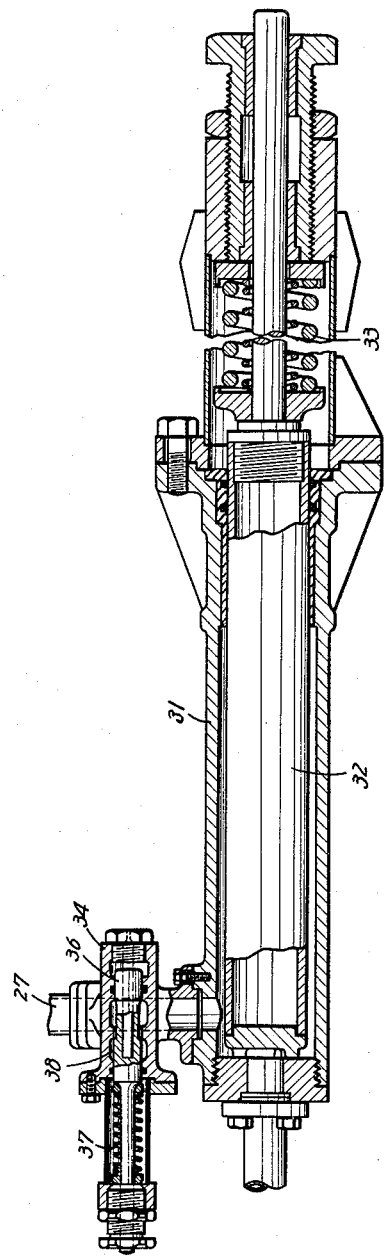

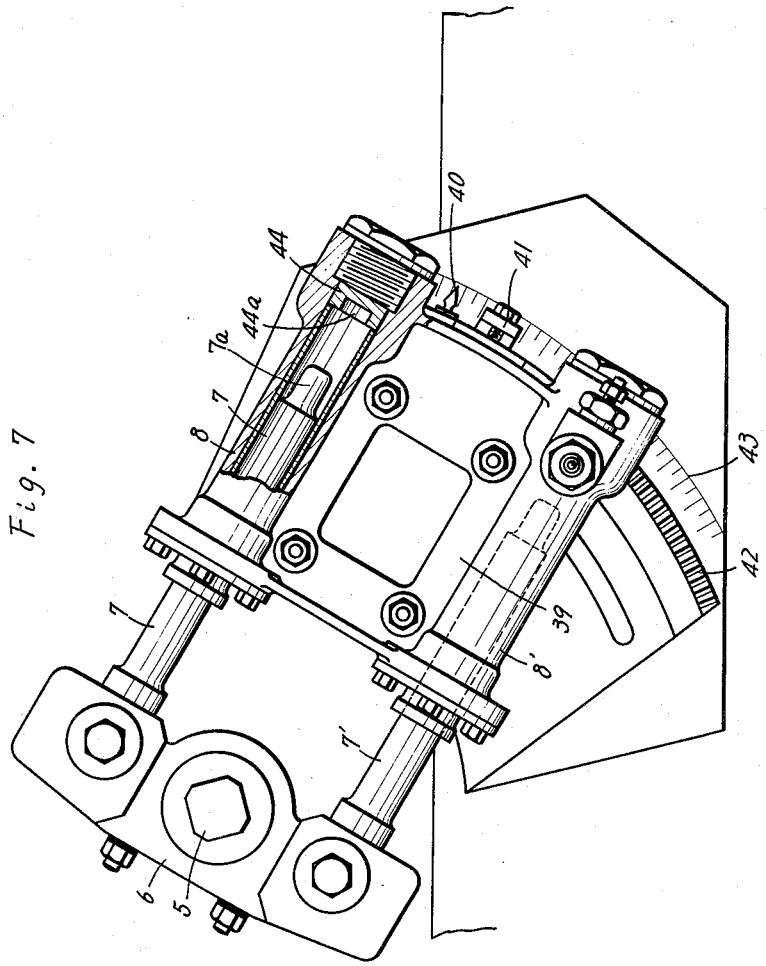
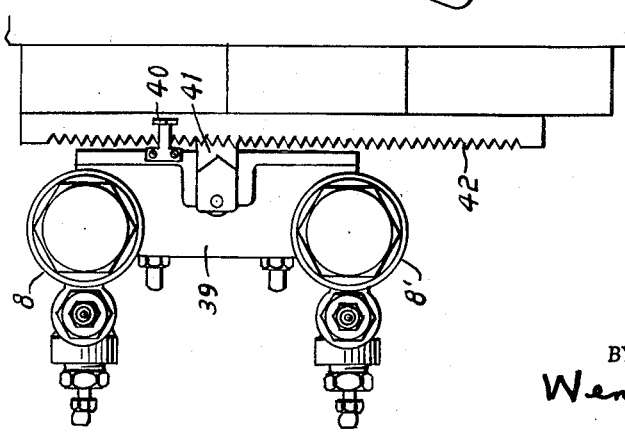

United States Patent Office 3,014,624
Patented Dec. 26, 1961

3,014,624
APPARATUS FOR DISCHARGING CONCRETE
Minesaburo Shimatani, Yoshino-cho, Yoshino-gun, and Tsutoo Saito, Itami City, Japan, assignors to Seiwa Machinery Company Limited, Osaka City, Japan
Filed Feb. 17, 1959, Ser. No. 793,714
1 Claim. (Cl. 222—333)

This invention relates to improvements in the concrete discharge apparatus, and has for its object to raise the unit discharge amount of concrete and the size of the aggregates to a maximal extent.

The improved apparatus for discharging concrete of this invention basically comprises associating a plunger pump system with an oil pressure system in such a manner that the flow of the oil quickly reverses the concrete intake valve and the concrete discharge valve in association with the strokes of the plunger.

Stated in more detail, the concrete discharge apparatus of this invention consists of a housing having a working chamber connected to the plunger pump piston cylinder, a concrete intake valve provided in the upper portion of the working chamber, which portion is secured to a hopper, and a concrete discharge or outlet valve provided in the open mouth of the chamber, which mouth is secured to an extending pipe or conduit. Each of said valves is further associated at one end of the valve axle with a link, both ends of which link are connected with an oil pressure piston rod housed in an oil pressure cylinder; and each of said cylinders is associated by means of a connecting pipe with a rotary valve which is associated with the crank shaft of the plunger pump. With this rotary valve is associated the oil chamber in two ways: that is, by way of a gear pump and an accumulator for the forward flow of the oil on the one hand, and on the other, by means of a single connecting pipe for the return flow of the oil.

All these members are so associated with one another that the oil drawn out of the oil chamber by means of the gear pump is first accumulated and compressed in accumulator, and then the compressed oil is allowed to pass on unit of volume at a time, by means of the rotary valve, into one of the concrete intake valve motivating oil pressure cylinders and one of the concrete discharge valve motivating oil pressure cylinders. The oil thus employed is driven back into the oil chamber by way of the rotary valve when the remaining cylinders are motivated in the next instant by means of the forthcoming unit of the compressed oil. Thus the intake valve is converted to the open position the moment the discharge valve is converted to the closed position, and vice versa, in association with the strokes of the plunger. The conversion is almost instantaneous.

Thus a feature of this invention, unlike the ordinary concrete discharge apparatus wherein cam means are employed for motivating the intake and discharge valves of concrete, is in the instantaneous conversion of the valves into the open position from the closed, and vice versa. This conversion is further accelerated by means of raising the pressure of the oil.

Another feature of the invention is that the plunger pump system is so closely associated with the oil pressure system that the discharging of the concrete is performed in a maximal unit amount almost with no loss of timing.

A further feature of the invention is that the opening of the valves is regulatable simply by means of connecting the oil pressure cylinder unit to a control board.

A still further feature of the invention is that the overpressure due to mechanical troubles is preventable merely by means of connecting a safety valve to the accumulator.

Other objects and features of the invention will become apparent from the following disclosure and the accompanying drawings, wherein like reference characters are employed to designate like parts in all the views:

FIGURE 1 is a side elevational view of a concrete discharge apparatus embodying the principles of this invention;

FIGURE 2 is a plan view of FIGURE 1 with the hopper removed;

FIGURE 6 is a transverse sectional view of the accumulator;

FIGURE 7 is a plan view showing the intake valve motivating piston cylinder unit secured to a control board; and FIGURE 8 is a side elevation of FIGURE 7.

Figure 3A:
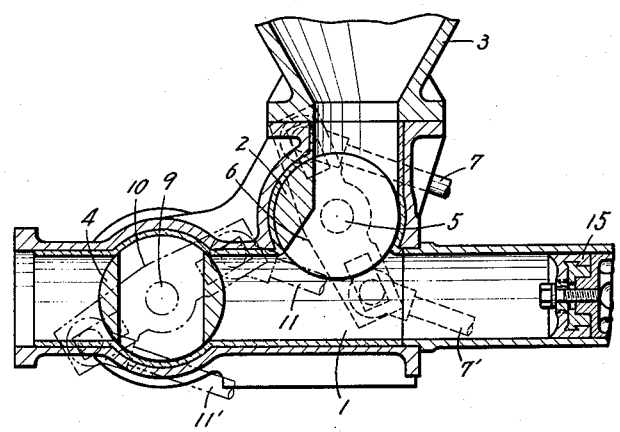
FIGURE 3A is a vertical sectional view showing the intake valve in the open position and the discharge valve in the closed position ready for drawing the concrete into the working chamber.

Referring first to FIGURES 1 to 3, a housing is provided having working chamber 1 connected to the pump piston cylinder, which houses an intake valve 2 right underneath the hopper 3 which is secured to the upper portion of the housing having therein the chamber 1. The housing further houses near the outer end thereof, which end is secured to an extending discharge pipe or conduit not shown in the drawings, a discharge valve 4. The intake valve 2 is connected at the back end of the axle 5 to a link 6; and the link 6 is associated at the respective ends thereof with an oil pressure piston rod 7 and 7', each of which rods 7 and 7' is housed in an oil pressure piston cylinder 8 and 8'. Likewise the discharge valve 4 is connected at the front end of the axle 9 to a link 10, and the link 10 is associated at the respective ends thereof with an oil pressure piston rod 11 and 11', each of which rods 11 and 11' is housed in an oil pressure piston cylinder 12 and 12'. The hopper 3 is provided with an electric motor 13 to move a stirrer 14 along the interior surface. The plunger 15 is associated with a crank shaft 16; and the crank shaft 16 is associated with a speed reducer 17 which is driven by means of an electric motor 18.

Figure 5:
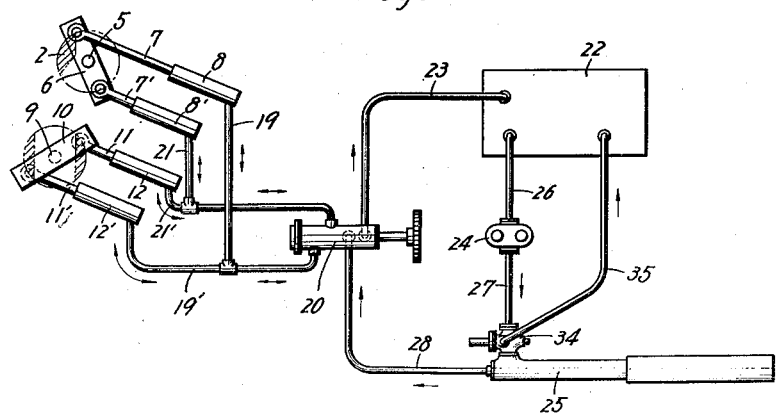
FIGURE 5 is a diagrammatical representation of the circulation system of the oil.

Referring next to FIGURE 5, each of the oil pressure piston cylinders 8 and 12' is associated by means of connecting pipes 19 and 19' with a rotary valve 20 which is associated with the crank shaft 16. Likewise each of the oil pressure piston cylinders 8' and 12 is associated with the rotary valve 20 by means of connecting pipes 21 and 21'. Said rotary valve 20 is associated with an oil reservoir 22 by means of a single connecting pipe 23, on the one hand, and on the other, by way of gear pump 24 and accumulator 25 associated with one another by means of connecting pipes 26, 27 and 28. The gear pump 24 is driven by means of an electric motor 29, and all these component parts are suitably secured to a carriage 30 as shown in FIGURES 1 and 2.

Figure 3B:
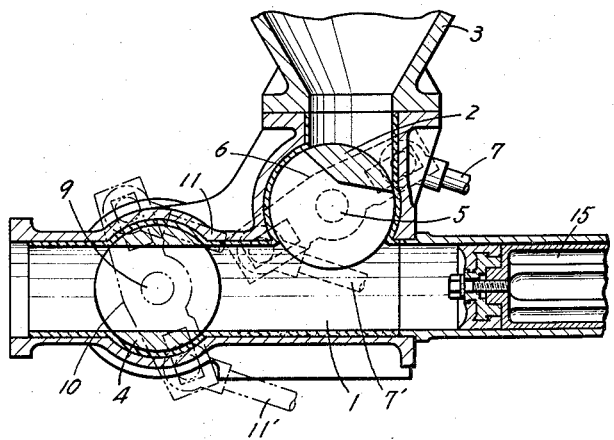
FIGURE 3B is a vertical sectional view showing the intake valve in the closed position and the discharge valve in the open position ready for discharging the concrete.

The operation of the concrete discharge apparatus of this invention is as follows:

When the apparatus is operated and the plunger 15 makes a backward stroke, a quantity of the oil which is drawn out of the oil chamber 22 by means of the gear pump 24 into the accumulator 25 and stored and compressed therein, is allowed to pass into the cylinders 8 and 12' by way of the rotary valve 20, whereby the piston rods 7 and 11' are pushed forward to move the intake valve 2 to the open position and the discharge valve 4 to the closed position as shown by dotted lines in FIGURE 3A. Consequently a quantity of concrete is allowed to pass into the working chamber 1 from the hopper 3, and the oil previously employed in the cylinders 8' and 12 is driven back into the oil chamber 22 by way of the rotary valve 20 and the connecting pipe 23. And the quantity of concrete thus taken into the working chamber 1 is discharged therefrom by way of the discharge valve 4 at the next instant when the plunger 15 makes a forward stroke and a quantity of oil stored and compressed in the accumulator 25 is allowed to pass into the cylinders 8' and 12 by way of the rotary valve 20, whereby the piston rods 7' and 11 are pushed forward to move the intake valve 2 to the closed position and the discharge valve 4 to the open position as shown by dotted lines in FIGURE 3B. The oil previously employed in the cylinders 8 and 12' is driven back into the oil chamber 22 by way of the rotary valve 20 and the connecting pipe 23.

Figure 4A:
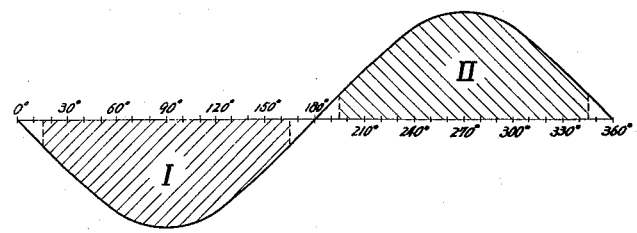
FIGURE 4A is a graphic representation of the efficiency of this invention, wherein the shaded area I represents the intake efficiency and the shaded area II the discharge efficiency.
Figure 4B:
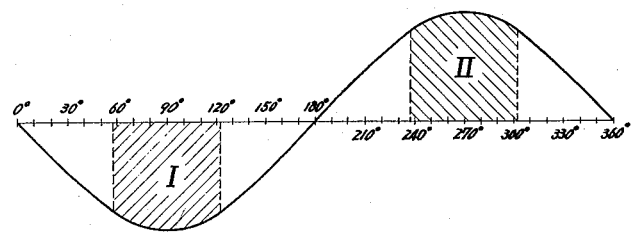
FIGURE 4B is a graphic representation of the efficiency of the apparatus employing cam means, wherein the shaded area I represents the intake efficiency and the shaded area II the discharge efficiency.

Thus the oil pressure system and the plunger pump system are so closely associated with each other that the alternative movement of the valves is performed almost instantaneously which is most conducive to the discharge of the concrete, and the unit amount of the concrete discharged in a single operation is raised to 95% from an ordinary 70% as shown in FIGURES 4A and 4B.

The over-pressure of the oil due to mechanical troubles in the oil pressure system, usually occasioned by the aggregates getting in the way of the valves, is prevented in two ways as shown in FIGURES 5 and 6. In the first place, the accumulator 25 is provided within its cylinder 31 with rod 32 and resilient member 33 in such a manner that the oil is allowed to push the rod 32 against the resilient member 33 to mitigate the over-pressure. In the second place, another safety device 34 which is associated wtih the oil chamber 22 by means of a connecting pipe 35 and comprising safety valve 36 and resilient member 37, is secured to the accumulator 25. When the pressure is further raised, the oil is allowed to push the safety valve 36 against the resilient member 37 and pass into the oil chamber 22 by way of the outlet 38 secured to the connecting pipe 35. Thus the size of the aggregates is raised from ordinary 50 millimeters to 60 millimeters in diameter in case a 6-inch discharge pipe or conduit is employed.

The opening of intake and discharge valves 2 and 4 is regulated as desired along the principles as illustrated in FIGURES 7 and 8, wherein the intake valve oil pressure cylinders 8 and 8' are secured as a unit to a control board 39 provided with an indicator 40, and the board 39 is geared by means of a wedge 41 with a plate 42 which is secured to the frame of the carriage 30. The plate 42 is provided with a scale 43. Thus the opening of the intake valve 2 is regulated according to the desired opening selected by means of the indicator 40 and the scale 43. The same device is also secured to the discharge valve actuating oil pressure cylinders 12 and 12' for regulating the opening of the discharge valve 4.

Means for reducing the mechanical shocks caused by the return stroke of the oil pressure piston rod is contrived along the principles as shown in FIGURE 7. The one end of the piston rod 7 housed in the cylinder 8 is provided with a projection 7a of a smaller diameter than that of the main body of the rod 7, and the bottom portion of the cylinder 8 is engaged with a nut 44 provided with a cavity 44a, which cavity is sizable enough to tightly receive therein said projection 7a. Thus the oil retained in the cavity 44a during the course of operation is compressed by means of the projection 7a to act as a shock absorber when the rod 7 is on the return stroke.

Having described hereinbefore our invention as related to various forms of embodiment of the same, it is our intention that the invention be not limited to any of the details of description unless otherwise specified but be construed rather broadly within the spirit and scope of invention as set forth in the accompanying claim.

What we claim is:

A plunger-type pressure actuated concrete pump, comprising a housing having a working chamber therein, a plunger pump having electric driving means secured to the housing and a plunger in said chamber forming part of said plunger pump and driven by said plunger pump driving means, a rotary concrete intake valve in the housing opening into the upper portion of the working chamber, a hopper secured to said portion of the housing for the working chamber and situated immediately above the intake valve, a rotary concrete discharge valve in the housing opening out of the working chamber, each valve having an axle on which it rotates, a link secured to the outer end of each of the intake and discharge valve axles, a piston rod connected to each end of each of the links, a cylinder housing each of said piston rods, a rotary control valve to one side of which is hydraulically connected the cylinders containing the pistons connected to one end of each link and to the other side of which is hydraulically connected the cylinders containing the pistons connected to the other end of each link, said rotary control valve being connected to the crank shaft of the plunger pump, an accumulator hydraulically connected with the rotary control valve, a gear pump hydraulically connected with the accumulator, an oil container which is hydraulically connected, on the one hand, with the gear pump for the forward flow of the oil, and on the other, with the rotary control valve for the return flow of the used oil, and means for controlling the size of opening of the valves comprising a controller secured to the intake-valve actuating cylinder unit and a controller secured to the discharge-valve actuating cylinder unit, whereby oil is drawn out of the oil container by means of the gear pump and is stored and compressed in the accumulator, the compressed oil then passes by way of the rotary control valve into one of the intake-valve cylinders and one of the discharge-valve cylinders, and the oil thus employed is driven back into the oil container by way of the rotary control valve and the single connecting pipe when the remaining cylinders are actuated in the same manner, whereby the intake valve is moved to the open position the moment the discharge valve is moved to the closed position alternately in association with the backward and forward strokes of the plunger.

References Cited in the file of this patent

UNITED STATES PATENTS

| | | |
|---|---|---|
| 675,401 | Oddie | June 4, 1901 |
| 2,062,200 | Ball | Nov. 24, 1936 |
| 2,643,677 | MacLean | June 30, 1953 |
| 2,761,424 | Hopkins | Sept. 4, 1956 |

FOREIGN PATENTS

| | | |
|---|---|---|
| 698,629 | Great Britain | Oct. 21, 1953 |
| 909,120 | France | Apr. 30, 1946 |
| 1,139,160 | France | June 26, 1957 |